United States Patent [19]

Barrall

[11] 4,109,032
[45] Aug. 22, 1978

[54] METHOD FOR TREATING LIGHTWEIGHT, NON-CEMENTITIOUS BUILDING MATERIAL

[75] Inventor: Jeffery L. Barrall, Lancaster, Pa.

[73] Assignee: Armstrong Cork Company, Lancaster, Pa.

[21] Appl. No.: 744,273

[22] Filed: Nov. 23, 1976

[51] Int. Cl.$^2$ .............................................. B05D 3/02
[52] U.S. Cl. ...................... 427/255; 52/515; 106/DIG. 2; 106/287.14; 427/387; 428/447
[58] Field of Search .................. 427/255, 245, 372 R, 427/384, 385 C, 387; 428/443, 446, 447, 454, 540, 310, 316, 321; 52/515, 517; 106/2, DIG. 2, 287 S, 287 SB, 287 SE

[56] References Cited

U.S. PATENT DOCUMENTS

| | | | |
|---|---|---|---|
| 2,502,286 | 3/1950 | Sowa | 428/454 |
| 2,574,168 | 11/1951 | Brick | 427/245 |
| 2,683,674 | 7/1954 | Hatcher et al. | 52/515 |
| 2,685,533 | 8/1954 | Trigg et al. | 428/447 |
| 2,914,426 | 11/1959 | Gaines | 428/454 |
| 2,916,461 | 12/1959 | Krantz | 428/447 |
| 3,048,499 | 8/1962 | Jellinek | 427/387 |
| 3,079,361 | 2/1963 | Plueddemann | 428/447 |
| 3,382,170 | 5/1968 | Pape | 427/387 |
| 3,397,073 | 8/1968 | Fehner | 428/405 |
| 3,424,598 | 1/1969 | Snyder et al. | 428/447 |
| 3,687,718 | 8/1972 | Morrison et al. | 427/255 |
| 3,772,065 | 11/1973 | Seiler | 428/447 |
| 3,819,400 | 6/1974 | Plankl et al. | 427/387 |

OTHER PUBLICATIONS

Neville; A. M., "Properties of Concrete", p. 343, N. Y., John Wiley & Sons, Inc.

*Primary Examiner*—Ronald H. Smith
*Assistant Examiner*—Sadie L. Childs

[57] ABSTRACT

A method for treating a lightweight building material, the material comprising sodium silicate as a binder and an expanded inorganic aggregate. The building material is contacted with a reactive organo silane, the resulting treated building material is nonefflorescent.

6 Claims, No Drawings

METHOD FOR TREATING LIGHTWEIGHT, NON-CEMENTITIOUS BUILDING MATERIAL

BACKGROUND OF THE INVENTION

1. Field of the Invention

This invention relates to non-cementitious building materials. More particularly, it relates to an improved lightweight, cement-free building material utilizing sodium silicate as a binder and an expanded siliceous inorganic aggregate.

2. Description of the Prior Art

For many years those skilled in the art have provided a variety of compositions that are useful as low-cost, thermal insulating building materials particularly of use in commercial and residential buildings. The most common of such materials are those having binders comprising cement, such as Portland cement, admixed with a lightweight inorganic aggregate as, for example, vermiculite or perlite. While building materials composed of these materials are generally useful, they are disadvantageously porous and absorb water readily from the ambient atmosphere. Under freeze/thaw conditions, the deterioration in physical properties of these materials is dramatic, and their use as building materials is substantially diminished. Attempts to avoid the water susceptibility of such materials have eventually led to lightweight building materials having good thermal insulation and comprising binders that may include various cements, but also include the silicates of potassium or sodium. Unlike the cement-based materials, these compositions show acceptable water resistance and do not absorb the quantities of water found so disadvantageous in the cement-based compositions. However, they are not entirely immune from water absorption and absorb very small quantities of moisture from the atmosphere. While not being particularly affected under freeze/thaw conditions, a significant manifestation of the small amounts of water absorption appears in the form of efflorescence, a sign that is particularly indicative of the dissolution of the silicate glass binder. In systems of this nature, this dissolution of the silicate binder is more rapid in the presence of small amounts of water than with large amounts. The reason for this is that the sodium oxide in silicate glass is leached out, giving a solution of sodium hydroxide, the resulting residual binder being of higher $SiO_2$—$Na_2O$ ratio. It is well recognized that the silica will leach out of this material when the pH of the solution becomes high. Therefore, in the presence of a small amount of water, a given amount of sodium oxide leached from the siliceous glass will give a higher pH than would the same amount when leached into a larger quantity of water. Thus, silicate glass binders, which contain water because drying conditions are not sufficient to convert them to the anhydrous form or because of absorption of small amounts of water from the ambient atmosphere, will be adversely affected. Two major disadvantages occur. The sodium hydroxide formed reacts with carbon dioxide present in the atmosphere, forming sodium carbonate, which manifests itself as efflorescence, e.g. a white powder, on the surface of the board. Secondly, if the sodium hydroxide solution surrounding the glass binder is sufficiently concentrated, the remainder of the silicate glass binder will dissolve, completely destroying any binding capability with any building material and resulting in complete failure of such material. The efflorescence problem can be solved by using the potassium silicate glasses instead of the sodium ones, potassium carbonate not efflorescing as does sodium carbonate. However, potassium glasses are economically disadvantageous when compared to the sodium silicates.

Accordingly, it is an object of the present invention to provide a lightweight, non-cementitious building material that shows little deterioration in physical properties when exposed to ambient atmosphere.

It is a further object of the present invention to provide a lightweight, non-cementitious building material that contains sodium silicate and is non-efflorescent.

SUMMARY OF THE INVENTION

There is provided by virtue of this invention an improved inorganic material which can be formed by a continuous sheet operation. The sheet material is one comprising an inorganic siliceous aggregate and sodium silicate which, because of certain treatments, shows improved strength after exposure to ambient conditions and non-efflorescence. The method of treating this sheet material involves the contacting of the surface or surfaces of such with a silane of the formula

$$R_n SiCl_m$$

wherein R is $C_1$ to $C_4$ alkyl, $C_1$ to $C_4$ alkoxy or mixtures thereof, and n and m are 0 to 4, with the proviso that when m is 0 at least one R is $C_1$ to $C_4$ alkoxy.

DESCRIPTION OF THE PREFERRED EMBODIMENT

The building material useful in accordance with the present invention is a thermally insulating, fire retardant, non-cementitious board product comprising sodium silicate binder and an expanded siliceous inorganic aggregate; and for certain special cases to give good handling and the like, organic fibers such as polyester fibers or polyamide fibers, etc. This building material is treated by the method of this invention so as to not only decreases the tendency of the sodium silicate to effloresce, but improves the long-term physical properties of the composition.

In a preferred embodiment of the present invention, where good insulation qualities and high flame resistance are sought, an expanded perlite is used. The preferred perlite, in accordance with the present invention, has the characteristics of a loose bulk density of between 2 and 10 pounds per cubic foot, and a particle size of between 5 and 100 as measured by a standard Tyler Sieve Mesh. Such is present in the formulations in accordance with the present invention in amounts of from about 80% to about 39% based on amount of total formula, preferably 60% to 45% by weight.

While the preferred embodiment, in accordance with the present invention, utilizes expanded perlite having the above characteristics, other embodiments using various expanded siliceous inorganic aggregates can also be used herein. Accordingly, expanded perlite having densities and particle sizes outside of the range disclosed above may also be useful where the density, strength, or insulating values of the resulting building material are not of primary importance. By the same token, other heat-resistant siliceous inorganic aggregates, such as expanded clay, cellular glass, expanded vermiculite and cellular diatomaceous earths, may also be used as part or total replacement for the expanded perlite disclosed above.

In conjunction with the expanded perlite, an inorganic binder is used which is a sodium silicate. While potassium silicate is useful in this invention and may replace sodium silicate in its entirety, it suffers from disadvantageously high cost in comparison to sodium silicate. The preferred embodiment of the present invention, therefore, utilizes sodium silicate as the binder for the preferred expanded perlite. In practicing the present invention and as noted in the earlier discussion, the more alkaline silicates have adverse effects on the efflorescence and strength of the building material incorporating these materials. Therefore, it is preferred to use sodium silicates comprising alkali to silica ratios of from about 1:4 to about 1:2 in amounts, as hereinafter shall be set forth on a dry weight basis, from about 15% to about 60% based on the dry weights of solids of the product. While a satisfactory product may be made within these ranges, the following ranges are preferred: A ratio of alkali to silica of from about 1:4 to about 1:3 and from about 25% to about 40% of dry silicate in the composition of the product.

If the soluble silicates have an alkali:silica ratio higher than 1:4, then solubility of the resulting alkali silicates diminishes to the extent that solutions of such are difficult to form. Further, if amounts of less than 15% of dry silicate is used, the finished product will be weakened, while more than 60% of dry silicate will result in a board of undesirably high density having poor physical properties, e.g. low insulating ability and low N.R.C. Similarly, adverse effects are noted with alkali silicate ratios higher than that shown.

Compositions comprising the above-disclosed expanded perlite or other siliceous inorganic material and sodium silicate will, as noted earlier, show efflorescence and a decrease in physical property with time of exposure to ambient conditions. This building material in accordance with the present invention is additionally treated so as to inhibit efflorescence. The materials used in such treatment are generally characterized by the presence of a reactive silane moiety, e.g. —Si—, and have the general formula $R_nSiCl_m$ wherein R is $C_1$ to $C_4$ alkyl, $C_1$ to $C_4$ alkoxy or mixtures thereof and $n$ and $m$ are 0 to 4, with the proviso that when $m$ is 0 at least one R is $C_1$ to $C_4$ alkoxy. Illustrative of the silanes useful in accordance with the present invention are the following:

tetrachlorosilane
trichloromethylsilane
dichlorodimethylsilane
chlorotrimethylsilane
trichloroethylsilane
dichloroethylsilane
chlorotriethylsilane
trichloropropylsilane
dichlorodipropylsilane
chlorotripropylsilane
tetramethoxysilane
trimethoxymethylsilane
dimethoxydimethylsilane
methoxytrimethylsilane
tetraethoxysilane
diethoxydimethylsilane
diethoxydiethylsiloxane
diethoxydi-n-propylsiloxane The term "treatment" as used herein is meant to characterize a broad range of techniques whereby the silane composition is brought into contact with the surfaces of the building material at various temperatures and pressures. Thus, the silane can contact the building material by application as a film, spray or mist. This embodiment also includes the treatment whereby the building material is passed through a vat or container of reactive silane or silane solution. As such, the silane can be used either in a solvent or without a solvent. Solvent application is preferred in this embodiment of the present invention.

As a further method of "treatment", the surfaces of the building material are contacted with the reactive silane vapors, such generated as, for example, by placing the building material in a closed chamber with the reactive silane at ambient temperature and pressure. Higher temperature or lower pressure can also be used in the closed chamber, the objective of this embodiment obtained by having an atmosphere of silane vapor in contact with the surfaces of the building material.

The efflorescence inhibition treatment is most successful in the improved building material in accordance with the present invention when an amount no less than 2 ml/square foot of building material surface of efflorescence inhibitor is applied. As an upper limit to the amount of efflorescence inhibitor useful herein, amounts greater than 50 ml/square foot of building material surface should not be exceeded. Inhibitor concentrations of greater than such percentage show weakened building material physical properties, whereas amounts of less than 2 ml/square foot do not effectively provide protection against efflorescence and physical property diminution from exposure to ambient conditions. Preferably, an application of 5 ml/square foot of efflorescence inhibitor to 25 ml/square foot efflorescence inhibitor is used, most preferably 5 ml/square foot to 10 ml/square foot.

Optionally, up to about 30 weight percent of the expanded siliceous inorganic aggregate may be replaced by other materials, such comprising organic fibers. While a composition may be formed from amounts greater than this, the resulting material fails to meet certain building product fire requirements, e.g. it burns readily. Preferably, 5% of the expanded siliceous inorganic aggregate is replaced by organic fibers, most preferably 1% by weight. The organic fibers may be polyester, polyamide, or polypropylene fiber, or even mixtures of such fibers. Vitreous fibers may be used to replace the organic fibers provided that they are alkali-resistant so as to not be dissolved by the sodium silicate binder. Such alkali resistance is accomplished by means of the chemical composition of the fibers or by protective dressings applied to the fibers. These alkali-resistant fibers can be used as a total replacement of the organic fibers or as partial replacement of such. Preferably, 30%–60% of the organic fiber is replaced by the vitreous fiber in this embodiment of the present invention.

When solvents are used to carry the above reactive silanes into contact with the building material surface, such should be nonreactive with the inhibitor silane and of sufficient volatility to be readily removed after treatment. As such, various aromatic solvents such as benzene, toluene and xylene are useful, as are the aliphatic solvents such as pentane and hexane. Hexane is the solvent of preference.

In the above-discussed organic solvent-based treatment, the concentration of reactive silane in the solvent should be sufficient to allow the surface of the building material to be uniformly contacted with the solution without undue saturation of its interior. Concentrations of from 5 to 50 ml of reactive silane in 100 ml of solvent are useful, 10 to 30 ml/100 ml preferred and 10 ml/100 ml of solvent most preferred.

The building material to be treated in accordance with the present invention, is formed by admixing the expanded siliceous inorganic aggregate with the sodium silicate solution. In the case where organic or inorganic fibers are also used herein, the expanded aggregate is first mixed with the fluffed fibers in the dry form and the mixture then wetted with sodium silicate solution. In either case, the resulting composition is in the form of a slightly wet mixture somewhat resembling damp sand. The slightly wet mixture is then pressed and dried. Pressing and drying is accomplished by pressing the mixture to a desired thickness at about 30-200 psi. The pressed board-like mass is then oven dried, preferably at 200° F. for about 3 hours. After the oven drying has been completed, the board-like product is readily treated by the process in accordance with the present invention by application of the liquid reactive silane or of vaporous silane to the board surfaces as disclosed above. In order that the invention be better understood, improved building materials in accordance with the present invention, together with their method of manufacture as disclosed above, will be described by way of examples. In the following description of the process for treating building materials, the building material used in the process was of the following formulation:

Expanded Perlite; 200 grams
Sodium Silicate Solution comprising sodium silicate:-water in 1:3.22; 104 grams The furnish ingredients were mixed in a conventional mechanical mixer. To the expanded perlite of bulk density 3 lbs/ft$^3$, Tyler Sieve Mesh 5-100 was added the sodium silicate solution and mixing was continued until the mixing mass was uniformly wet. The resulting wetted solids were formed into a board and pressed at 60 psi and 200° F. for three hours. The resultant dry board had a thickness of ⅜ inch, a density of 1.1 pounds/board foot, and a modulus of rupture of 120 psi.

EXAMPLE 1

A 2-foot square of the board-like building material obtained as illustrated above was sprayed on the surface with a 10% solution of dichlorodimethylsilane in hexane. Spraying was continued until a total concentration of 2 ml/square foot of board surface of the silane inhibitor had been applied. Density and modulus of rupture were unaffected.

The efflorescence of the building materials treated by the process of this invention as illustrated in the above examples and other illustrative examples was evaluated by the following test technique. A sample approximately 3 inches by 9 inches is placed in the desiccator having 1 to 2 inches of water. Carbon dioxide gas is then passed into the desiccator and after 3 minutes of allowing the gas to flood the desiccator volume, the lid is attached. After 24 hours, the sample is removed and allowed to air dry. Efflorescence is evaluated by a visual examination of the amount of efflorescent materials formed on the sample after undergoing the test, on a scale of 0 to 10, 0 being no efflorescence. The following table illustrates the results obtained for samples treated in accordance with the present invention.

| Example[a] | Efflorescence Inhibiting Treatment | Concentration, ml | Degree of Efflorescence |
| --- | --- | --- | --- |
| 1 | Surface Spray | 2.0 | 0 |
| 2 | " | 6.0 | 0 |
| 3 | " | 3.5 | 0 |
| 4 | Immersion | 7.0 | 0 |
| 5 | Vapor | 5.0 | 0 |
| Comparative | Surface Spray | 1.0 | 10 |
| Comparative[b] | " | 0 | 10 |

[a]The formulations of Examples 2-4 are identical to that set forth in Example 1, except for the increased addition of the efflorescence inhibitor to reach the desired concentration in ml/square foot.
[b]Surface of the building material was sprayed with hexane only in the procedure identical to Example 1.

Having now fully described the invention, it will be apparent to one skilled in the art that many changes and modifications can be made thereto without departing from the spirit or the scope of the invention as set forth herein.

What is claimed is:

1. A process for inhibiting efflorescence of a cement-free, sodium silicate/inorganic aggregate composition which comprises treating said composition with a reactive silane of the formula $R_nSiCl_m$ wherein R is $C_1$ to $C_4$ alkyl, $C_1$ to $C_4$ alkoxy or mixtures thereof, and $n$ and $m$ are 0 to 4, with the proviso that when $m$ is 0 at least one R is $C_1$ to $C_4$ alkoxy.

2. The process of claim 1 wherein said composition comprises sodium silicate of $Na_2O:SiO_2$ of 1:4 to about 1:2 and an expanded siliceous inorganic aggregate.

3. The process of claim 2 wherein said expanded siliceous inorganic aggregate is perlite having a loose bulk density of between 2 to 10 pounds per cubic foot and between 5 to 100 Tyler Sieve Mesh number.

4. The process of claim 1 wherein said reactive silane is selected from the group consisting of trichloromethylsilane, dichlorodimethylsilane, chlorotrimethylsilane and mixtures thereof.

5. The process of claim 4 wherein said reactive silane is a 5% to 50% solution in an organic solvent.

6. The process of claim 4 wherein said reactive silane is vaporous.

* * * * *